(12) United States Patent
Twitchell, Jr.

(10) Patent No.: US 7,830,273 B2
(45) Date of Patent: Nov. 9, 2010

(54) SENSOR NETWORKS FOR PIPELINE MONITORING

(75) Inventor: Robert W. Twitchell, Jr., Cumming, GA (US)

(73) Assignee: Terahop Networks, Inc., Alpharetta, GA (US)

(*) Notice: Subject to any disclaimer, the term of this patent is extended or adjusted under 35 U.S.C. 154(b) by 842 days.

(21) Appl. No.: 11/465,466

(22) Filed: Aug. 18, 2006

(65) Prior Publication Data

US 2007/0043807 A1 Feb. 22, 2007

Related U.S. Application Data

(60) Provisional application No. 60/709,204, filed on Aug. 18, 2005, provisional application No. 60/719,061, filed on Sep. 21, 2005.

(51) Int. Cl.
*H04Q 5/00* (2006.01)
(52) U.S. Cl. ............... 340/870.07; 340/854.5; 73/40.5 R; 73/49.1
(58) Field of Classification Search ........... 340/870.07, 340/854.5; 73/49.1, 40.5 R
See application file for complete search history.

(56) References Cited

U.S. PATENT DOCUMENTS

| 4,613,990 | A | 9/1986 | Halpern |
|---|---|---|---|
| 4,680,583 | A | 7/1987 | Grover |
| 5,040,238 | A | 8/1991 | Comroe et al. |
| 5,117,501 | A | 5/1992 | Childress et al. |
| 5,129,096 | A | 7/1992 | Burns |
| 5,210,540 | A | 5/1993 | Masumoto |
| 5,265,025 | A | 11/1993 | Hirata |
| 5,295,154 | A | 3/1994 | Meier et al. |
| 5,331,637 | A | 7/1994 | Francis et al. |
| 5,369,784 | A | 11/1994 | Nelson |
| 5,400,254 | A | 3/1995 | Fujita |

(Continued)

FOREIGN PATENT DOCUMENTS

EP    0467036 A2    1/1992

(Continued)

OTHER PUBLICATIONS

"Scalable Routing Strategies for Ad hoc Wireless Networks", Atsushi Iwata et al., IEEE Journal on Selected Areas in Communications, Special Issue on Adhoc Networks, Aug. 1999, pp. 1369-1379.

(Continued)

*Primary Examiner*—Brian A Zimmerman
*Assistant Examiner*—Hung Q Dang
(74) *Attorney, Agent, or Firm*—Tillman Wright, PLLC; Chad D. Tillman; Jeremy C. Doerre

(57) ABSTRACT

A sensor network for monitoring of a pipeline comprises a sensor disposed for monitoring of a pipeline, the sensor capable of acquiring data related to the pipeline and communicating sensor data; a first remote sensor interface (RSI) comprising a data communications device capable of receiving the sensor data communicated from the sensor, and transmitting data relating to the received sensor data; and a data communications device capable of receiving the data transmitted by the first RSI and transmitting data related to the sensor data directly or indirectly to a network external to the sensor network. The sensor network comprises a common designation network.

30 Claims, 2 Drawing Sheets

U.S. PATENT DOCUMENTS

| | | |
|---|---|---|
| 5,425,051 A | 6/1995 | Mahany |
| 5,442,758 A | 8/1995 | Slingwine et al. |
| 5,511,232 A | 4/1996 | O'Dea et al. |
| 5,579,306 A | 11/1996 | Dent |
| 5,590,409 A | 12/1996 | Sawahashi et al. |
| 5,596,652 A | 1/1997 | Piatek et al. |
| 5,604,892 A | 2/1997 | Nuttall et al. |
| 5,640,151 A | 6/1997 | Reis et al. |
| 5,652,751 A | 7/1997 | Sharony |
| 5,682,379 A | 10/1997 | Mahany et al. |
| 5,686,902 A | 11/1997 | Reis et al. |
| 5,732,077 A | 3/1998 | Whitehead |
| 5,761,195 A | 6/1998 | Lu et al. |
| 5,790,946 A | 8/1998 | Rotzoll |
| 5,793,882 A | 8/1998 | Piatek et al. |
| 5,833,910 A | 11/1998 | Teixido |
| 5,890,054 A | 3/1999 | Logsdon et al. |
| 5,907,491 A | 5/1999 | Canada et al. |
| 5,917,423 A | 6/1999 | Duvall |
| 5,939,982 A | 8/1999 | Gagnon et al. |
| 5,943,610 A | 8/1999 | Endo |
| 5,950,124 A | 9/1999 | Trompower et al. |
| 5,974,236 A | 10/1999 | Sherman |
| 5,977,913 A | 11/1999 | Christ |
| 6,005,884 A | 12/1999 | Cook et al. |
| 6,006,100 A | 12/1999 | Koenck et al. |
| 6,072,784 A | 6/2000 | Agrawal et al. |
| 6,078,789 A | 6/2000 | Bodenmann et al. |
| 6,091,724 A | 7/2000 | Chandra et al. |
| 6,097,707 A | 8/2000 | Hodzic et al. |
| 6,104,512 A | 8/2000 | Batey, Jr. et al. |
| 6,118,988 A | 9/2000 | Choi |
| 6,125,306 A | 9/2000 | Shimada et al. |
| 6,127,976 A | 10/2000 | Boyd et al. |
| 6,134,587 A | 10/2000 | Okanoue |
| 6,192,400 B1 | 2/2001 | Hanson et al. |
| 6,198,913 B1 | 3/2001 | Sung et al. |
| 6,201,974 B1 | 3/2001 | Lietsalmi et al. |
| 6,256,303 B1 | 7/2001 | Drakoulis et al. |
| 6,313,745 B1 | 11/2001 | Suzuki |
| 6,354,493 B1 | 3/2002 | Mon |
| 6,360,169 B1 | 3/2002 | Dudaney |
| 6,381,467 B1 | 4/2002 | Hill et al. |
| 6,404,082 B1 | 6/2002 | Rasinski et al. |
| 6,405,102 B1 | 6/2002 | Swartz et al. |
| 6,409,082 B1 | 6/2002 | Davis et al. |
| 6,418,299 B1 | 7/2002 | Ramanathan |
| 6,424,260 B2 | 7/2002 | Maloney |
| 6,424,264 B1 | 7/2002 | Giraldin et al. |
| 6,427,913 B1 | 8/2002 | Maloney |
| 6,473,607 B1 | 10/2002 | Shohara et al. |
| 6,512,478 B1 | 1/2003 | Chien |
| 6,529,142 B2 | 3/2003 | Yeh et al. |
| 6,542,114 B1 | 4/2003 | Eagleson et al. |
| 6,547,137 B1 | 4/2003 | Begelfer et al. |
| 6,559,620 B2 | 5/2003 | Zhou et al. |
| 6,600,418 B2 | 7/2003 | Francis et al. |
| 6,611,556 B1 | 8/2003 | Koener et al. |
| 6,614,349 B1 | 9/2003 | Proctor et al. |
| 6,665,585 B2 | 12/2003 | Kawase |
| 6,700,533 B1 | 3/2004 | Werb et al. |
| 6,720,888 B2 | 4/2004 | Eagleson et al. |
| 6,737,974 B2 | 5/2004 | Dickinson |
| 6,745,027 B2 | 6/2004 | Twitchell, Jr. |
| 6,747,562 B2 | 6/2004 | Giraldin et al. |
| 6,753,775 B2 | 6/2004 | Auerbach et al. |
| 6,760,578 B2 | 7/2004 | Rotzoll |
| 6,761,312 B2 | 7/2004 | Piatek et al. |
| 6,765,484 B2 | 7/2004 | Eagleson et al. |
| 6,816,063 B2 | 11/2004 | Kubler et al. |
| 6,847,892 B2 | 1/2005 | Zhou et al. |
| 6,934,540 B2 | 8/2005 | Twitchell, Jr. |
| 6,940,392 B2 | 9/2005 | Chan et al. |
| 6,975,614 B2 | 12/2005 | Kennedy |
| 7,012,529 B2 | 3/2006 | Sajkowsky |
| 7,027,773 B1 | 4/2006 | McMillin |
| 7,098,784 B2 | 8/2006 | Easley et al. |
| 7,126,470 B2 | 10/2006 | Clift et al. |
| 7,133,704 B2 | 11/2006 | Twitchell, Jr. |
| 7,142,121 B2 | 11/2006 | Chan et al. |
| 7,155,264 B2 | 12/2006 | Twitchell, Jr. |
| 7,191,934 B2 | 3/2007 | Miller et al. |
| 7,200,132 B2 | 4/2007 | Twitchell, Jr. |
| 7,209,468 B2 | 4/2007 | Twitchell, Jr. |
| 7,209,771 B2 | 4/2007 | Twitchell, Jr. |
| 7,221,668 B2 | 5/2007 | Twitchell, Jr. |
| 7,282,944 B2 | 10/2007 | Gunn et al. |
| 7,391,321 B2 | 6/2008 | Twitchell |
| 2001/0000019 A1 | 3/2001 | Bowers et al. |
| 2002/0039896 A1 | 4/2002 | Brown |
| 2002/0098861 A1 | 7/2002 | Doney et al. |
| 2002/0119770 A1 | 8/2002 | Twitchell, Jr. |
| 2002/0146985 A1 | 10/2002 | Naden |
| 2003/0083064 A1 | 5/2003 | Cooper |
| 2003/0141973 A1 | 7/2003 | Yeh et al. |
| 2003/0144020 A1 | 7/2003 | Challa et al. |
| 2003/0179073 A1 | 9/2003 | Ghazarian |
| 2003/0209601 A1 | 11/2003 | Chung |
| 2004/0021572 A1 | 2/2004 | Schoen et al. |
| 2004/0041731 A1 | 3/2004 | Hisano |
| 2004/0082296 A1 | 4/2004 | Twitchell, Jr. |
| 2004/0100415 A1 | 5/2004 | Veitch et al. |
| 2004/0121793 A1 | 6/2004 | Weigele et al. |
| 2004/0135691 A1 | 7/2004 | Duron et al. |
| 2004/0183673 A1 | 9/2004 | Nageli |
| 2004/0232924 A1* | 11/2004 | Hilleary et al. ............. 324/700 |
| 2005/0043068 A1 | 2/2005 | Shohara et al. |
| 2005/0093702 A1 | 5/2005 | Twitchell, Jr. |
| 2005/0093703 A1 | 5/2005 | Twitchell, Jr. |
| 2005/0145018 A1* | 7/2005 | Sabata et al. ................. 73/49.1 |
| 2005/0215280 A1 | 9/2005 | Twitchell, Jr. |
| 2005/0226201 A1 | 10/2005 | McMillin |
| 2007/0008408 A1* | 1/2007 | Zehavi ....................... 348/143 |
| 2007/0041333 A1 | 2/2007 | Twitchell |

FOREIGN PATENT DOCUMENTS

| | | |
|---|---|---|
| EP | 0748083 | 12/1996 |
| EP | 0748085 | 12/1996 |
| EP | 0829995 | 3/1998 |
| EP | 1317733 A2 | 6/2003 |
| EP | 1692599 A2 | 8/2006 |
| EP | 1692668 A2 | 8/2006 |
| WO | WO0068907 | 11/2000 |
| WO | WO0069186 | 11/2000 |

OTHER PUBLICATIONS

"Cluster Based Routing Protocol", Internet-Draft Mingliang, Jiang et al., National University of Singapore, Jul. 1999.

Gary Morgan, Miniature Tags Provide Visibility & Cohesion for an LIA Battalion Level 'Proof of Principle', Pacific NW National Laboratory, Apr. 2001, Gary.morgan@pnl.gov.

Kevin Sharp, Physical Reality: A Second Look, Supply Chain Systems, http://www.idsystems.com/reader/1999_03/phys0399_pt2/index.htm, Mar. 1999, Helmers Publishing, Inc.

U.S. Appl. No. 60/444,029, of Nageli, filed Jan. 31, 2003.

Ram Ramanathan et al., Hierarchically-Organized, Multihop Mobile Wireless Networks for Quality-of-Service Support, pp. 1-35, 1998.

Guangyu Pei et al., Mobility Management in Hierarchical Multi-hop Mobile Wireless Networks, 6 pages, 1999.

http://www/iprg.nokia.com/charliep/txt/manet/term.txt, Mobile Ad Hoc Networking Terminology, C. Perkins, Nov. 17, 1998, visited Nov. 13, 2000.

Daniel Lihui Gu et al., C-ICAMA, A Centralized Intelligent Channel Assigned Multiple Access for Multi-Layer Ad-Hoc Wireless Networks with UAVs, 6 pages, 2000.

Atsushi Iwata, et al., Scalable Routing Strategies for Ad Hoc Wireless Networks, IEEE Journal on Selected Areas in Communications, vol. 17, No. 8, Aug. 1999, pp. 1369-1379.

http://www.cs.ucla.edu/NRL/wireless/PAPER/draft-ietf-manet-admrp-02.txt, Sung-Ju Lee et al., On-Demand Multicast Routing Protocol (ODMRP) for Ad Hoc Networks, Jan. 2000, visited Nov. 13, 2000.

Guangyu Pei, et al., A Wireless Hierarchical Routing Protocol with Group Mobility, 1998 IEEE, 5 pages.

Charles E. Perkins, Ad Hoc Networks, Jan. 2001, table of contents, chapters 1, 4, and 11.

J.J. Gardia-Luna-Aceves et al., Source-Tree Routing in Wireless Networks, 1999, 10 pages.

Jean-Pierre Hubaux et al., Toward Self-Organized Mobile Ad Hoc Networks: The Terminodes Project, IEEE Communications Magazine, Jan. 2001, pp. 118-124.

Jaap Haartsen et al., Bluetooth: Vision, Goals, and Architecture, Mobile Computing & Communications Review, vol. 1, No. 2, 1998, 8 pages.

Jaap Haartsen, Bluetooth—The Universal Radio Interface for Ad Hoc, Wireless Connectivity, Ericsson Review No. 3, pp. 110-117, 1998.

Daniel Lihui Gu et al., Hierarchical Routing for Multi-Layer Ad-Hoc Wireless Networks with UAV's, 5 pages, 2000.

U.S. Appl. No. 60/499,338, of Easley et al., filed Sep. 3, 2003.

Keshavarzian et al., Energy-Efficient Link Assessment in Wireless Sensor Networks, INFOCOM 2004. 23rd Annual Joint Conference of the IEEE Computer and Communications Societies, vol. 3, 2004, pp. 1751-1761.

Stojmenovic et al., Design Giudelines for Routing Protocols in Ad Hoc and Sensor Networks with a Realistic Physical Layer, Communications Magazine, IEEE, vol. 43, Issue 3, Mar. 2005, pp. 101-106.

Melodia et al., On the Interdependence of Distributed Topology Control and Geographical Routing in Ad Hoc and Sensor Networks, Selected Areas in Communications, IEEE Journal, vol. 23, Issue 3, Mar. 2005, pp. 520-532.

* cited by examiner

SENSOR NETWORKS FOR PIPELINE MONITORING

I. CROSS-REFERENCE TO RELATED APPLICATIONS

The present application is a nonprovisional of, and claims priority under 35 U.S.C. §119(e) to Twitchell, U.S. Provisional Patent Application No. 60/709,204 filed Aug. 18, 2005, and Twitchell, U.S. Provisional Patent Application No. 60/719,061 filed Sep. 21, 2005. The entire disclosure of these patent applications are hereby incorporated herein by reference.

II. INCORPORATION BY REFERENCE

The present application hereby incorporates by reference: U.S. Pat. No. 6,753,775 B2 (titled "Smart Container Monitoring System"); U.S. Pat. No. 6,745,027 B2 (titled "Class Switched Networks for Tracking Articles"); International Patent Application Publication No. WO 2003/032501 A2, which international patent application designated the United States and was published in English (titled "Network Formation in Asset-Tracking System Based on Asset Class"); International Patent Application Publication No. WO 2003/098851 A1, which international patent application designated the United States and was published in English (titled "LPRF Device Wake Up Using Wireless Tag"); U.S. Patent Application Publication No. 2005/0093703 A1 (titled "Systems and Methods Having LPRF Device Wake Up Using Wireless Tag"); U.S. Patent Application Publication No. 2004/0082296 A1 (titled "Network Formation in Asset-Tracking System Based on Asset Class"); U.S. Patent Application Publication No. 2004/0183673 A1 (titled "Portable Detachable Self-Contained Tracking Unit for Two-Way Satellite Communication with a Central Server"); U.S. patent application Ser. No. 11/422,321 ("Remote Sensor Interface Stepped Wake-Up Sequence"), published as U.S. patent application Publication No. 2006/0276161 A1; U.S. patent application Ser. No. 11/423,127 ("All Weather Housing Assembly for Electronic Components"), published as U.S. patent application Publication No. 2006/0289204 A1; U.S. patent application Ser. No. 11/428,535 ("Communicating Via Nondeterministic and Deterministic Network Routing"), published as U.S. patent application Publication No. 2007/0002792 A1; and U.S. patent application Ser. No. 11/428,536 ("Maintaining Information Facilitating Deterministic Network Routing"), published as U.S. patent application Publication No. 2007/0002793 A1. Unless otherwise noted, terms used herein are in accordance with definitions of such terms set forth in these references of the appendices.

III. COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

IV. BACKGROUND OF THE INVENTION

It is believed that over 80 million barrels of oil are consumed per day and that, on average, about 40% of the oil being consumed is transported via pipeline. Often oil pipelines are hundreds of miles long and transect remote and hazardous terrain that is not easily accessible. Because of the volume of oil being transported daily, it is vital to be able to quickly and accurately monitor such pipelines. Such monitoring is important not only to business operations but also to addressing environmental and health safety issues.

Accordingly, embodiments of the present invention provide sensor networks that efficiently and timely provide information to appropriate parties regarding pipelines.

V. SUMMARY OF THE INVENTION

The present invention generally relates to continuous, real-time, and event driven monitoring of pipelines through which flow assets such as refined and natural resource materials. Furthermore, the present invention relates to sensors and networks thereof disposed along remote pipelines that require observation, protection, inspection, and occasional visitations for services, repairs, and threat-related responses. The networks may be class-based networks and/or remote sensor interface (RSI) networks.

Furthermore, it should be noted that, as used in some of the incorporated references, such as U.S. Pat. No. 6,745,027 B2 and U.S. Application Publication No. 2005/0093703 A1, a "class-based" network represents a network, nodes of which (and specifically, the data communication devices of the nodes of which) share a common "class" designation, which class designation in such references is representative of an asset class. The asset class, in turn, represents a grouping of assets—whether the same or different—that share something in common, such as an attribute, characteristic, relation, or behavior, and each asset comprises a person or thing that is desired to be tracked or monitored.

For example, with respect to a person, an asset may be an employee, a team member, a law enforcement officer, or a member of the military. With respect to a thing or article, an asset may be, for example, a good, product, package, item, vehicle, warehoused material, baggage, passenger luggage, shipping container, belonging, commodity, effect, resource, or merchandise.

The data communication devices of the class-based networks also are disclosed as being low power radio frequency (LPRF) devices, and each device is disclosed as preferably including a standards based radio such as, for example, a Bluetooth radio. Each data communication device further is disclosed as preferably including memory for storing sensor-acquired data.

As will be apparent to the Ordinary Artisan, a class-based network is a network which nodes comprise data communication devices that share a common designation, and which network is formed based on such common designation. As used herein, a network which nodes comprise data communication devices that share a common designation, and which network is formed based on such common designation, is considered to be a "common designation" network. In a class-based network, the common designation of the network is the class designation, and a class-based network therefore is representative of a common designation network.

A remote sensor interface (RSI) network as used herein represents a network, nodes of which (and specifically, the data communication devices of the nodes of which) each are disposed in electronic communication with one or more sensors for acquiring data there from. The RSI network may be a class-based network, in which case the nodes also share a common class designation representative of an asset class. For instance, a class-based network of the incorporated '027 Patent and a class-based network of the incorporated '703

Application Publication each comprises an RSI network when the data communication devices of the nodes include sensor-acquired information obtained from associated sensors. The sensors may be temperature and humidity sensors, for example, for detecting the temperature and humidity relative to an asset being tracked or monitored.

Additionally or alternatively, the nodes of an RSI network may share a common designation other than a class designation. For instance, an RSI network may include data communication devices that interface with certain types of sensors, and the data communication devices may share a common designation that is representative of such sensors. The common designation of the RSI network in this case is not necessarily representative of an asset to be tracked or monitored by such sensors, although it may be.

The present invention includes many aspects and features. In an aspect of the invention, a sensor network for monitoring of a pipeline comprises a sensor disposed for monitoring of a pipeline, with the sensor being capable of acquiring data related to the pipeline and communicating sensor data; a first remote sensor interface (RSI) comprising a data communications device capable of receiving the sensor data communicated from the sensor and transmitting data relating to the received sensor data; and a data communications device capable of receiving the data transmitted by the first RSI and transmitting data related to the sensor data directly or indirectly to a network external to the sensor network. The sensor network comprises a common designation network.

In a feature of this aspect, the data communications device comprises a second RSI. In accordance with this feature, the network further comprises a plurality of spatially separated RSIs disposed along the pipeline for monitoring of the pipeline. Data related to the sensor data is transmitted and received among the plurality of RSIs such that data related to the sensor data propagates along the pipeline. In further accordance with this feature, data related to the sensor data propagates in a particular direction along the pipeline among the plurality of RSIs in a sequential order according to increasing distance from the first RSI.

In another feature of this aspect, the data communications device comprises a gateway capable of at least intermittent communications with the external network. In an additional feature, the sensor comprises a substance sensor. With regard to this feature, the substance sensor is sensitive to a substance present within the pipeline such that the substance sensor is capable of detecting the substance escaping from the pipeline.

In a further feature, the sensor comprises a hydrocarbon sensor. In a still further feature, the sensor comprises a device or array of devices for measuring state conditions of a pipeline or that of its contents such as temperature, flow rate, and pressure. In another feature, the sensor comprises an activity-monitoring or reconnaissance device such as a camera, a microphone, a motion detector, a light detector, and a broadband RF signal scanner.

In an additional feature, the sensor comprises a device for detecting physical presence at a pipeline, a leak of a pipeline, or tampering with a pipeline. In yet another feature, the sensor comprises an accelerometer or an acoustic pulse detector. In still yet another feature, the sensor acquires data regarding the security, integrity, configuration, condition, disposition, orientation, location, contents, or surroundings of the pipeline.

In accordance with this aspect, the sensor is capable of detecting an automobile driven proximal to the pipeline. In further accordance with this aspect, the pipeline is an oil pipeline. With regard to this aspect, the sensor network is a class-based network. With further regard to this aspect, the sensor network is an ad hoc class-based network.

In another feature, the sensor network comprises at least two class-based networks disposed along an extent of the pipeline, whereby data communications along the pipeline may be sent over one class-based network to the exclusion of the other class-based network.

In an additional feature, the data communication device of the first RSI includes a standards based radio. The data communication device includes a second receiver that wakes the standards based radio upon receipt of a broadcast that includes a common designation of the first RSI. In accordance with this feature, the first RSI is configured to add, change, or remove one or more common designations thereof based on instructions communicated to the first RSI. With regard to this feature, the sensor network comprises at least two class-based networks disposed along an extent of the pipeline, whereby data communications along the pipeline may be sent over one class-based network to the exclusion of the other class-based network.

In another aspect of the invention, a method for monitoring of a pipeline includes a pipeline having (i) a sensor disposed for monitoring of a pipeline, (ii) a plurality of remote sensor interfaces disposed generally along an extent of the pipeline, and (iii) a data communications device disposed proximate the pipeline for receiving data from the at least one remote sensor interface and communicating with a network external to the wireless sensor network. The method includes the steps of (a) acquiring, by the sensor, data related to the pipeline; (b) after step (a), communicating, by one of the remote sensor interfaces, sensor data; (c) after step (b), receiving, by another one of the remote sensor interfaces, the sensor data; (d) after step (c), transmitting data, by the other remote sensor interface, that relates to the received sensor data; (e) after step (d), receiving, by the data communications device, data transmitted by one of the remote sensor interfaces that relates to the sensor data; (f) and after step (e), communicating, by the data communications device, data that is related to the sensor data to a network external to the wireless sensor network.

In a feature of this aspect, at least one common designation network is formed. In another feature, a plurality of common designation networks are formed. In yet another feature, the method further comprises supplying power to the at least one remote sensor interface utilizing solar power. With regard to this feature, solar power is supplied by at least one solar panel.

In an additional feature, the method further comprises supplying power to the gateway utilizing solar power. In accordance with this feature, solar power is supplied by at least one solar panel. In a further feature, communicating data related to the sensor data to a network external to the wireless sensor network includes communicating via a satellite radio signal.

In another feature, communicating data related to the sensor data to a network external to the wireless sensor network includes communicating via a cellular telephony signal. In still another feature, the step (f) is performed by a gateway upon receipt of an appropriate wake-up signal and is not performed at periodic intervals determined based on a timer of the gateway.

In addition to the aforementioned aspects and features of the present invention, it should be noted that the present invention further includes the various possible combinations of such aspects and features.

VI. BRIEF DESCRIPTION OF THE DRAWINGS

Further aspects, features, embodiments, and advantages of the present invention will become apparent from the following detailed description with reference to the drawings, wherein.

VII. DETAILED DESCRIPTION

Figure 1:
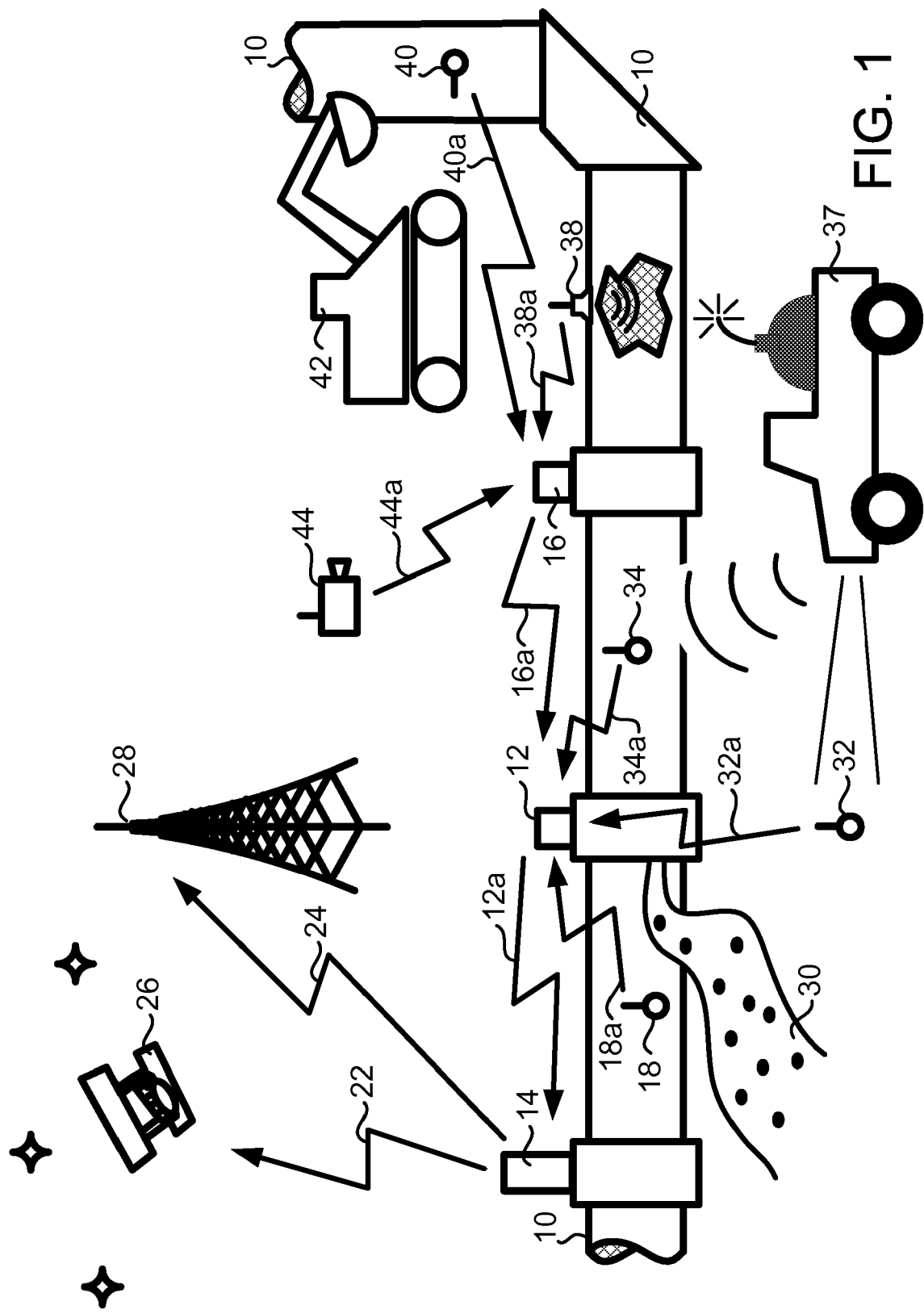
FIG. 1 is a schematic illustration of a sensor network for pipeline monitoring according to a preferred embodiment of the present invention.

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, preferred embodiments of the present invention are next described. The following description of preferred embodiments is merely exemplary in nature and is in no way intended to limit the invention, its application, or uses.

FIG. 1 is a schematic illustration of a sensor network for pipeline monitoring according to a preferred embodiment of the present invention. A sensor network 100 comprises a first remote sensor interface RSI 12, a second remote sensor interface RSI 16, a gateway 14, and sensors 18,32,34,38,40,44. A pipeline 10 and surrounding environment are monitored by the sensor network 100.

Figure 2:
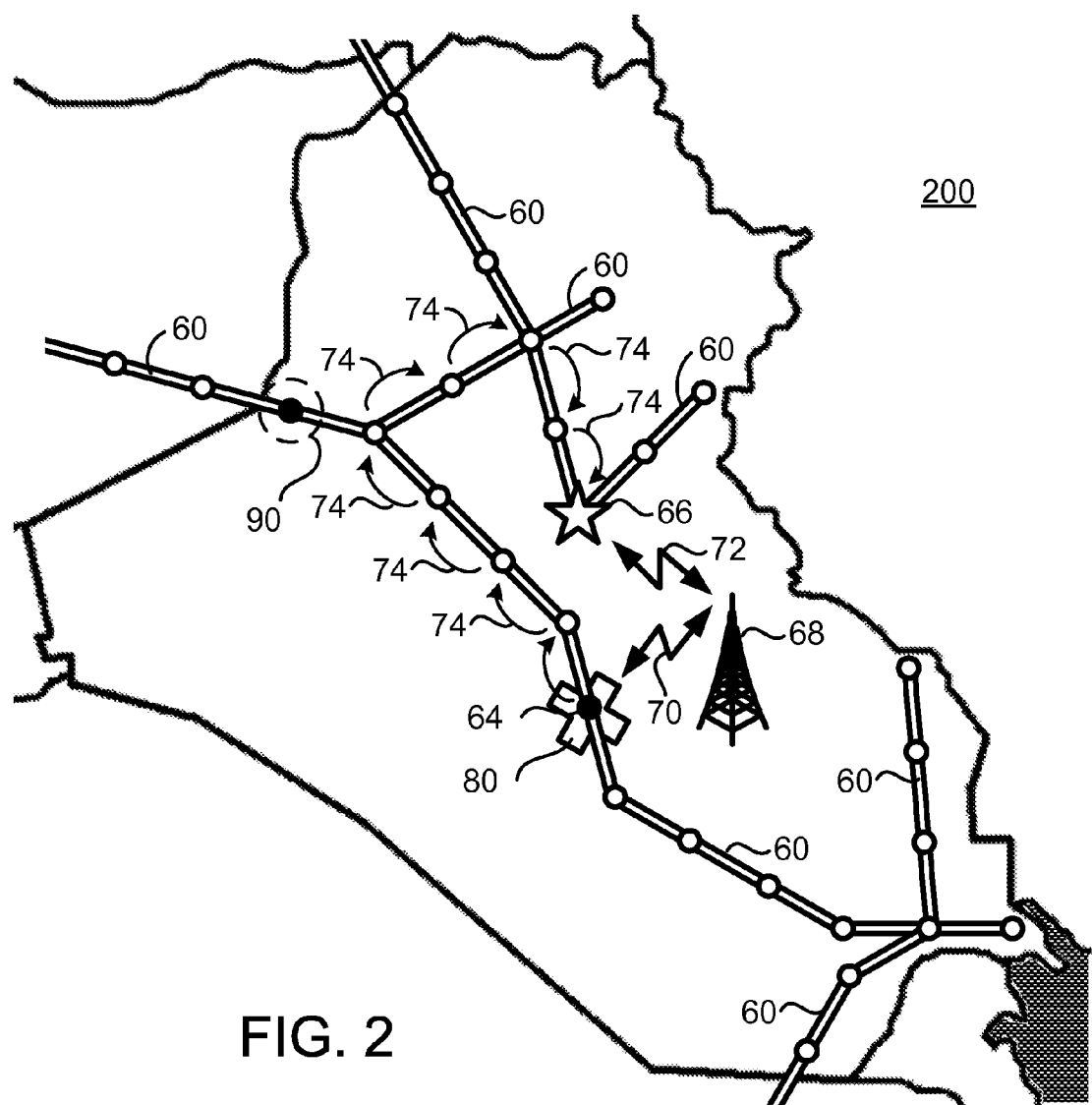
FIG. 2 is a schematic illustration of a sensor network used to monitor a transcontinental pipeline in accordance with a preferred embodiment of the present invention.

Pipelines 10,60 are illustrated in FIGS. 1 and 2 as above-ground transcontinental oil pipelines merely for exemplary and illustrative purposes. It should be understood that the descriptions herein relate as well to other types of pipelines, such as natural gas pipelines, water pipelines, and buried pipelines. Further, particular chemicals transported by pipelines to which descriptions herein relate include, but are not limited to, crude oil, petroleum, petroleum distillates, petrochemicals, gasoline, hydrocarbons, methane, and natural gas.

Each sensor 18,32,34,38,40,44 is capable of acquiring data related to the pipeline and communicating sensor data. The communication may be as a function of the data acquired. As used herein with respect to the monitoring of a pipeline, the term "sensor" relates broadly to many types of devices that are each in some way sensitive to the security, integrity, condition, or surroundings of a pipeline. Thus, a sensor can be a substance or chemical sensor that detects pipeline leaks and ruptures by detecting contents of the pipeline escaping into the surrounding environment. A sensor can be a device or array of devices for discerning the interior conditions of a pipeline such as flow rate, temperature, and pressure. A sensor can be any activity-monitoring or reconnaissance device such as a camera, a microphone, a motion detector, a light detector, an infrared (IR) light sensor, and a broadband RF signal scanner. A sensor can be a device for detecting physical presence potentially related to tampering such as a pressure-sensitive pad on a floor or surface, a switch on an access panel or valve, an optical device such as an infrared beam device, and an accelerometer for detecting impulses transmitted through the material flow as a result of mechanical contact with the pipeline. A sensor, which can further be sensitive to acts or events of nature, can be a ground-monitoring device such as geophone for detecting ground vibrations and seismic events.

In general, as described herein, a remote sensor interface (RSI) deployed in association with a pipeline collects data from one or more sensors and communicates the data (directly or indirectly through other RSIs and gateways) to an external network such as a cellular telephony network, a satellite radio network, or the Internet. Thus, an interested party at a centralized location is able to receive information and alerts from remotely deployed sensors and RSIs and is thereby informed of a pipeline related event or condition to which a response may be needed or is appropriate. Examples of interested parties include, but are not limited to, local emergency response teams, HAZMAT response teams, oil industry engineers and work teams, natural resource authorities, military officials, law enforcement officials, multi-national inspection teams, and both the suppliers and intended recipients of pipeline transported materials. Several incorporated references provide further descriptions of RSIs, gateways, and networks formed thereby, while the present invention described herein relates to various implementations of such RSIs, gateways, and networks in association with pipelines.

Referring to FIG. 1, the RSIs 12,16 are generally capable of receiving sensor data communicated from sensors 18,32,34, 38,40,44 and further transmitting data related to the received sensor data. In this way, the sensor network 100, whether class-based or otherwise, collects data in monitoring the pipeline 10 and propagates data along the pipeline 10.

In further transmitting data related to received sensor data, an RSI 12,16 may merely pass signals along by receiving and re-transmitting signals without substantively restructuring the signals or adding information thereto. Thus sensor data communicated by a particular sensor may propagate unchanged along the sensor network 100 as RSIs act, in a sense, as sequential signal boosters. On the other hand, an RSI 12,16 may receive a first signal and transmit a second signal that is based in part on the first signal but that conveys additional information. For example, the additional information can include a time stamp and the identity of the RSI. Thus, as information propagates along the sensor network, the pathway and chronology of the propagation can be identified.

In implementations of sensor networks in accordance with preferred embodiments, common designation networking is utilized, the RSIs may form, for example, at least two common designation networks disposed along an extent of the pipeline such that data communications along the pipeline may be sent over one common designation network to the exclusion of the other common designation network. Moreover, data communications along the pipeline also may be sent over more than one of the common designation networks, as desired, for redundancy in transmission of the data communications along the pipeline; in this respect, data communications along the pipeline may be sent independently over two or more common designation networks. Accordingly, multiple lines of independent communication may be established based on different common designation networks formed by the RSIs. It is believed that such "multi-designation" paths may improve time required for data communications to reach their intended destination by minimizing hops, may provide redundancy for transmissions that avoid single points of failure in successfully delivering the data communications, and may better accommodate complex orientations of sensors and paths along the pipeline. It also should be appreciated that an RSI may include membership in one or more common designation networks such that the same RSI may be utilized in the redundant data communications. While this is not necessarily preferred, as it presents a possible single point of failure situation, it nevertheless may be necessary to utilize the same RSI along a particular extent of the pipeline if, for example, the RSI is the only RSI that is present or operational and that is able to continue the data communications in two different common designation networks along the pipeline.

In any event, information related to the monitored pipeline 10 generally propagates along the sensor network 100 and is ultimately routed, for example, via a gateway 14, to an external network for further communication to an interested party.

The gateway 14 receives a signal 12a from the RSI 12 and communicates pipeline monitoring information to external networks via satellite communications 22 and/or cellular communications 24. In this respect, the gateway 14 communicates via satellite communications 22 with satellite 26 and/or communicates via cellular communications 24 with a tower 28. Cellular communications preferably are used when a cell tower is within range of the gateway, and satellite communications preferably are used when cellular communications are unavailable to the gateway. The information conveyed by communications 22,24 is further carried by respective external networks, of which the satellite 26 and tower 28 are parts, to one or more interested parties. Such external networks may comprise, for example, the Internet.

Communications may be transmitted by the gateway in various ways. For example, wireless signals transmitted by the gateway may be received by an antenna in a proprietary wireless network such as that at a controlled private facility. In another example, the gateway transmits a satellite radio signal but not a cellular telephony signal, and, in yet another example, the gateway transmits a cellular telephony signal but not a satellite radio signal.

In yet another example, the gateway is disposed proximal a node or hub of an external network and conveys pipeline monitoring information to the external network by way of a cabled connection. Such an example relates particularly to a gateway disposed at a facility such as a pumping station or terminus of the pipeline.

In another example, the gateway transmits information to a mobile interrogator unit, which may be disposed on an airplane that performs a fly-by of the gateway. In such an example, the gateway receives and collects information from RSIs and stores the information for conveying to the mobile interrogator unit. The mobile interrogator unit then is directly transported to the appropriate party for download of the information received by the mobile interrogator unit, or the information otherwise is communicated to the appropriate party through one or more external networks.

Various types of sensors for monitoring the pipeline, the contents and conditions within the pipeline, and the area surrounding the pipeline are within the scope of the present invention. Several exemplary sensor types and the events and conditions to which they relate are described below. It should be understood that the description contained herein relates to other sensor types as well. Each sensor may be an on-board component of an RSI as a part thereof or may be external to an RSI. Insofar as sensors are external to RSIs, as in the following examples, such sensors are capable of communicating with RSIs either wirelessly or by way of cabled connections.

With regard to a first example, the sensor 18 comprises a substance or chemical sensor. Oil flows along the interior of the pipeline 10. The sensor 18 is disposed to monitor for oil escaping or leaking from the pipeline. In this example, oil 30 is escaping the pipeline 10 and is detected by the sensor 18. This example relates in general to many substances and chemicals that may leak from pipelines or may pour from breaches thereof. However, for the purpose of providing descriptions of a particular pipeline incident, this example relates to oil 30 escaping an oil pipeline, and thus, the sensor 18 comprises a hydrocarbon sensor capable of detecting vaporized hydrocarbons in the environment surrounding the leak. The sensor 18 acquires data related to the pipeline leak and communicates sensor data by transmitting a wireless signal 18a that conveys the sensor data to the RSI 12 associated with the sensor 18.

The RSI 12 receives the signal 18a and transmits the wireless signal 12a conveying, among other things, data relating to the sensor data received from the sensor 18. In response to its receipt of the signal 12a, the gateway 14 communicates information regarding the detection of the leaking substance via the satellite communications 22 and/or the cellular communications 24 for further propagation of the information by way of networks associated respectively with the Earth orbiting satellite 26 and/or cell tower 28. The gateway 14 thereby performs, in a sense, as a relay device that receives data transmitted by the RSI 12 and transmits related data directly to an external network.

Information regarding the oil 30 escaping the pipeline is thereby propagated from the sensor 18 to the RSI 12, along the pipeline from the RSI 12 to the gateway 14, and from the gateway to one or more external networks.

Additionally, in according with some preferred embodiments of the invention, an RSI receiving the signal 18a indicating an oil leak transmits an appropriate signal (not shown) in the direction "upstream" of the sensor 18. Moreover, the direction of this communication may be the same as, or opposite to, the direction of propagation of the wireless signal reporting the oil leak to the appropriate party. This additional signal preferably would be directed to a shutoff mechanism for closing off flow of the pipeline, thereby stopping the leak while the appropriate party is being alerted. Inspection and confirmation of the leak then could be accomplished by the appropriate party, thereby insuring that the automated cutoff of the flow was appropriate.

In another example, the sensor 32 comprises a light detector that can detect headlight beams of an unauthorized vehicle 37 driving within a restricted area about the pipeline 10, for example, along a maintenance road, at a time of night when no such travel is authorized or expected. The sensor 32 transmits a wireless signal 32a that communicates sensor data related to the detection of light and the presence of the vehicle. Such detection may be merely related to a maintenance team working at unexpected hours or may relate to the presence of a threat such as a pipeline saboteur. In a similar example, the sensor 32 comprises a motion detector that is sensitive to the movement of a vehicle or person approaching or traveling along the pipeline.

The RSI 12 receives the signal 32a and transmits the wireless signal 12a that conveys, among other things, data relating to the sensor data received from sensor 32. In response to its receipt of the signal 12a, the gateway 14 communicates information regarding the detection of light (or the detection of motion) by the sensor 32 via the satellite communications 22 and/or the cellular communications 24 for further propagation of the information by way of networks associated respectively with the Earth orbiting satellite 26 and/or cell tower 28.

Information regarding the detection of light (or motion) is thereby propagated from the sensor 32 to the RSI 12, along the pipeline from the RSI 12 to the gateway 14, and from the gateway to one or more external networks.

With regard to another example, the sensor 34 comprises a sound detector that can detect the engine noise of an unauthorized vehicle 37 driving within a restricted area about the pipeline 10, for example along a maintenance road. The sensor 34 transmits a wireless signal 34a that communicates sensor data related to the detection of noise and the presence of the vehicle.

The RSI 12 receives the signal 34a and transmits the wireless signal 12a that conveys, among other things, data relating to the sensor data received from the sensor 34. In response to its receipt of the signal 12a, the gateway 14 communicates information regarding the detection of noise by the sensor 34 via the satellite communications 22 and/or the cellular communications 24 for further propagation of the information by way of networks associated respectively with the Earth orbiting satellite 26 and/or cell tower 28.

Information regarding the detection of noise is thereby propagated from the sensor 34 to the RSI 12, along the pipeline from the RSI 12 to the gateway 14, and from the gateway to one or more external networks.

With regard to another example, the sensor 38 comprises an ultrasonic flow meter that utilizes Doppler technology in continuously or intermittently monitoring the flow of oil within the pipeline 10. The sensor 38 transmits a wireless signal 38a that communicates sensor data related to flow monitoring. For example, the sensor may transmit signals upon detecting a change in flow rate. A change in the flow rate along a pipeline may be a symptom of a leaking or blocked pipeline. Furthermore, differences in the flow of a piped substance as measured at different locations along the pipeline can be indicative of unauthorized or illegal tapping of the pipeline for the purpose of theft of the substance flowing through the pipeline.

The RSI 16 receives the signal 38a and transmits the wireless signal 16a that conveys, among other things, data relating to the sensor data received from the sensor 38.

In response to its receipt of the signal 16a, the RSI 12 transmits the signal 12a that conveys, among other things, data relating to one or more flow measurements by the sensor 38, which data is further conveyed via the gateway 14 to one or more external networks. The RSI 12 thereby performs, in a sense, as a relay device that receives data transmitted by the RSI 16 and transmits related data indirectly to an external network.

Information regarding a flow measurement is thereby propagated from the sensor 38 to the RSI 16, along the pipeline from the RSI 16 to the RSI 12 and gateway 14, and from the gateway to one or more external networks.

With regard to another example, the sensor 40 comprises an accelerometer that senses acoustic pulses caused by the occasional contact of objects with the pipeline 10. Contact of the pipeline, particularly by heavy mechanized equipment, can cause fractures in the pipeline and/or may rupture the pipeline. In this example, an earth moving machine 42 inadvertently contacts the pipeline causing an acoustic impulse to travel along the pipeline. The sensor 40 transmits a wireless signal 40a that communicates sensor data related to the sensed acoustic pulse.

The RSI 16 receives the signal 40a and transmits the wireless signal 16a that conveys, among other things, data relating to the acoustic pulse sensed by the sensor 40. Data related to the sensed acoustic pulse is further propagated along the sensor network via the RSI 12 and then to one or more external networks via the gateway 14.

With regard to yet another example, the sensor 44 comprises a camera that captures images of the pipeline and surrounding area continuously, intermittently according to a timed schedule, or upon a triggering event. For example, the camera 44 may be activated upon the detection of an acoustic pulse by the sensor 40. In any event, the camera 44 transmits a wireless signal 44a that communicates image data.

The RSI 16 receives the signal 44a and transmits the wireless signal 16a that conveys, among other things, data relating to the images captured by the camera 44. Data related to the images are further propagated along the sensor network via the RSI 12 and then to one or more external networks via gateway 14.

FIG. 2 is a schematic illustration of a sensor network used to monitor a transcontinental pipeline in accordance with a preferred embodiment of the invention. An exemplary transcontinental network of pipelines 60 transports national oil resources across urban and desolate regions of a country. The network of pipelines 60 is monitored by the sensor network 200. In a first remote location 80, a first sensor disposed for monitoring of the pipelines 60 has acquired data and communicated first sensor data to an RSI 64 at the remote location. Information related to the first sensor data ultimately reaches an interested party at a centralized urban location 66. The information is conveyed from the remote location 80 to the centralized urban location 66 by two exemplary paths.

According to one exemplary path, information is conveyed via a gateway located near the RSI 64 to a wireless communications tower 68 by way of a wireless signal 70. The information is further conveyed to the central urban location 66 by further communications 72, which can be conveyed by both wireless and cable-borne signals.

According to another exemplary path, information related to the first sensor data received by the RSI 64 propagates along the network of pipelines 60 from RSI to RSI and, ultimately, reaches the centralized urban location 66, which itself is located along the network of pipelines 60 as shown. For example, wireless signals 74 can be relayed from RSI to RSI in a sequential order according to increasing distance from the first RSI 64. Moreover, preferably each wireless signal transmitted by each RSI is transmitted for receipt by a predetermined RSI or predetermined gateway in order to avoid echoes along the pipeline and to prevent the distribution of information from a first remote location, for example remote location 80, to another remote location, for example remote location 90, where the information is not useful. FIG. 2 illustrates such predetermined routing of communications, wherein wireless signals 74 propagate along only certain segments of the network of pipelines 60 to directly reach the centralized urban location 66.

Furthermore, various different RSIs may be used to form networks along the network of pipelines 60. In this regard, physically adjacent, i.e., the very next, RSI along a pipeline may form the next adjacent node of the network in propagating the communications signal 74 along the pipeline.

Alternatively, if several RSIs are located within the transmission range of an RSI along the direction of transmission of the communications signal, then the furthermost RSI within the transmission range may form the next adjacent node of the network in which the communications signal is propagated. Indeed, by utilizing the furthermost RSI within the transmission range, the communication should reach the centralized urban location 66 in the shortest amount of time and with the fewest number of node-to-node (RSI-to-RSI) communications. A network that takes advantage of the maximum transmission range of the RSIs should provide minimum delay in notifying the appropriate parties, for example, of a critical spill or problem.

As previously discussed, more than one network may be established such that the same communications signals are transmitted via different RSIs, thereby providing redundancy in the communications. For instance, if repetitive clusters of RSIs are located along the network of pipelines, with each cluster being within transmission range of the adjoining clusters along the network of pipelines, and with each cluster having a first RSI with a first common designation and a second RSI with a second, different common designation, then two distinct and separate networks may be established for conveying the same communications to the centralized urban location. Providing redundancy in the communications insures against a single point of failure inhibiting the successful communication of the sensor-acquired data to the centralized urban location.

Sensors, RSIs, and gateways according to the invention optionally have attached thereto respective solar power collectors (not shown), and sensors, RSIs, and gateways, according to the invention, may be powered in part or solely by solar power collectors. The solar power collectors serve to recharge, supplement, or obviate electrical batteries that might otherwise be drained causing sensors, RSIs, and gateways to lose functionality. The solar power collectors thereby serve to reduce costs related to replacing spent batteries as well as serving to extend the potential range of sensor networks into areas where battery servicing is infeasible according to costs, according to needs for secrecy, or according to the presence of hazards posed by materials, conditions, or even hostile forces.

In further variations, one or more sensors may be powered by solar power collectors while the RSIs and/or gateways are powered by internal power sources such as batteries. Moreover, when internal power sources are utilized, the RSIs and/or gateways preferably reside in "standby" or "sleep mode" (or even in an "off" state) until awoken, preferably in accordance with one or more of the incorporated references based on a common designation thereof.

It further should be noted and appreciated that, when an RSI network comprises a common designation network, and when the data communication devices of the network include wake-up capabilities based on their common designations, as set forth in accordance with the incorporated references, the RSI network includes the additional benefit of having greater security.

In this regard, the RSI network could be configured such that, in order to wake-up a data communications device of the RSI network, the common designation of the data communications device must be known. Without knowing the common designation, the data communications device and, in particular, the standards based radio which the data communications device preferably includes, cannot be activated by an external wireless communication. As a result of this, an additional layer of security is added in addition to the security that may already form part of the protocol established in the industry for the standards based radio.

The common designation of the data communications device also can be changed, as desired, in accordance with the ability of the device to update, add to, or modify one or more of its common designations. An example of a routine for changing the common designation and, in particular, a class designation, is disclosed in the incorporated '027 Patent. Routinely changing the common designation to which the data communications device responds provides yet another layer of improved security.

Based on the foregoing description, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention.

Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the present invention being limited only by the claims appended hereto and the equivalents thereof.

What is claimed is:

1. A sensor network for monitoring of a pipeline, the network comprising:
   (a) first and second sensors disposed for monitoring of a pipeline, each sensor being configured to acquire data related to the pipeline and wirelessly communicate sensor data;
   (b) a first remote sensor interface (RSI) configured to,
      (i) receive the sensor data communicated from the sensors, and
      (ii) transmit data relating to the received sensor data; and
   (c) a data communications device configured to receive the data transmitted by the first RSI and transmit data related to the sensor data directly or indirectly to a network external to the sensor network;
   (d) wherein the sensor network comprises a common designation network;
   (e) wherein each of the first and second sensors are spatially separated from the first RSI along an extent of the pipeline; and
   (f) wherein each RSI transmitting data related to the sensor data such that said data propagates along the pipeline further adds additional information to said data, the additional information comprising an identification of the respective RSI such that the pathway through the common designation network is provided to the external network together with the data related to the sensor data.

2. The sensor network of claim 1, wherein the data communications device comprises a second RSI, each of the first RSI and second RSI forming a node in the common designation network.

3. The sensor network of claim 1, further comprising a plurality of spatially separated RSIs disposed along the pipeline for monitoring of the pipeline, each of the plurality of RSIs forming a node in the common designation network, wherein data related to the sensor data is transmitted and received among the plurality of RSIs such that data related to the sensor data propagates along the pipeline.

4. The sensor network of claim 3, wherein data related to the sensor data propagates in a particular direction along the pipeline among the plurality of RSIs in a sequential order according to increasing distance from the first RSI.

5. The sensor network of claim 1, wherein the data communications device comprises a gateway configured for at least intermittent communications with the external network.

6. The sensor network of claim 1, wherein the sensor comprises a substance sensor.

7. The sensor network of claim 6, wherein the substance sensor is sensitive to a substance present within the pipeline such that the substance sensor is configured to detect the substance escaping from the pipeline.

8. The sensor network of claim 1, wherein the sensor comprises a hydrocarbon sensor.

9. The sensor network of claim 1, wherein the sensor comprises a device or array of devices for measuring state conditions of a pipeline or that of its contents.

10. The sensor network of claim 1, wherein the sensor comprises an activity-monitoring or reconnaissance device such as a camera, a microphone, a motion detector, a light detector, and a broadband RF signal scanner.

11. The sensor network of claim 1, wherein the sensor comprises a device for detecting physical presence at a pipeline, a leak of a pipeline, or tampering with a pipeline.

12. The sensor network of claim 1, wherein the sensor comprises an accelerometer or an acoustic pulse detector.

13. The sensor network of claim 1, wherein the sensor acquires data regarding the security, integrity, configuration, condition, disposition, orientation, location, contents, or surroundings of the pipeline.

14. The sensor network of claim 1, wherein the sensor is configured to detect an automobile driven proximal to the pipeline.

15. The sensor network of claim 1, wherein the pipeline is a transcontinental pipeline.

16. The sensor network of claim 1, wherein the common designation is formed by a plurality of spatially separated RSIs disposed along the pipeline for monitoring of the pipeline, each of the plurality of RSIs forming a node in the common designation network; and further comprising a second plurality of spatially separated RSIs disposed along the pipeline for monitoring of the pipeline, each of the second plurality of RSIs forming a node in a second common designation network, wherein the first RSI is configured to transmit data relating to the received sensor data over one of the common designation networks to the exclusion of the other common designation network.

17. The sensor network of claim 1, wherein the common designation is formed by a plurality of spatially separated RSIs disposed along the pipeline for monitoring of the pipeline, each of the plurality of RSIs forming a node in the common designation network; and further comprising a second plurality of spatially separated RSIs disposed along the pipeline for monitoring of the pipeline, each of the second plurality of RSIs forming a node in a second common designation network, wherein the first RSI is configured to transmit data relating to the received sensor data over both of the common designation networks.

18. The sensor network of claim 17, wherein the first RSI is configured to add, change, or remove one or more common designations thereof based on instructions communicated to the first RSI such that the first RSI is configured to transmit data relating to the received sensor data over one of the common designation networks to the exclusion of the other common designation network.

19. The network of claim 1, wherein said step (e) of communicating, by the data communications device, data that is related to the sensor data to the external network includes communicating via a cabled connection extending between the data communications device and the external network.

20. A method for monitoring of a pipeline that includes (i) a plurality of sensors disposed generally along an extent of the pipeline for monitoring of the pipeline, (ii) a plurality of remote sensor interfaces disposed generally along an extent of the pipeline and constituting nodes of a communications network, and (iii) a data communications device disposed within transmission range of at least one of the remote sensor interfaces of the plurality of remote sensor interfaces for receiving data from the communications network and communicating data to a network external to the communications network, the method including the steps of:
   (a) acquiring, by the sensor, sensor data related to the pipeline;
   (b) wirelessly communicating, from the sensor to a remote sensor interface of the plurality of remote sensor interfaces, data that relates to the sensor data;
   (c) after step (b), communicating data that relates to the sensor data through the communications network to the data communications device, wherein each remote sensor interface of the plurality of remote sensor interfaces that transmits said data does so by transmitting said data to a furthermost remote sensor interface within transmission range thereof;

(d) after step (c), receiving, by the data communications device, from the communications network, said data that relates to the sensor data; and (e) after step (d), communicating, by the data communications device, data that is related to the sensor data to the external network;

(f) wherein each remote sensor interface of the plurality of remote sensor interfaces that transmits said data further adds additional information to said data, the additional information comprising an identification of the respective remote sensor interface such that the pathway through the communications network is provided to the external network together with said data related to the sensor data.

21. The method of claim 20, wherein each of the remote sensor interfaces of the plurality of remote sensor interfaces is configured to wirelessly communicate with one or more of the plurality of sensors.

22. The method of claim 20, further comprising supplying power to at least one remote sensor interface of the plurality of remote sensor interfaces utilizing solar power.

23. The method of claim 22, wherein solar power is supplied by at least one solar panel.

24. The method of claim 20, further comprising supplying power to the data communications device utilizing solar power.

25. The method of claim 24, wherein solar power is supplied by at least one solar panel.

26. The method of claim 20, wherein said step (e) of communicating, by the data communications device, data that is related to the sensor data to the external network includes communicating via a satellite radio signal.

27. The method of claim 20, wherein said step (e) of communicating, by the data communications device, data that is related to the sensor data to the external network includes communicating via a cellular telephony signal.

28. The method of claim 20, wherein said step (e) is performed by the data communications device upon receipt of an appropriate wake-up signal and is not performed at periodic intervals determined based on a timer of the data communications device.

29. The method of claim 20, wherein said step (e) of communicating, by the data communications device, data that is related to the sensor data to the external network includes communicating via a cabled connection extending between the data communications device and the external network.

30. The method of claim 20, further comprising the step of communicating, by a second data communications device, data that is related to the sensor data to the external network, wherein redundant communications of the sensor data to the external network are provided.

* * * * *